United States Patent Office 2,770,603
Patented Nov. 13, 1956

2,770,603

PRODUCTION OF SYNTHETIC RESINS BY REACTION OF DIOLEFIN POLYMERS WITH $SO_2$

Charles S. Lynch, Bartlesville, Okla., assignor to Phillips Petroleum Company, a corporation of Delaware No Drawing. Application December 31, 1952,
Serial No. 329,100

31 Claims. (Cl. 260—29.7)

This invention relates to polymers and their production. In one aspect this invention relates to a method for effecting reaction between a polymer of certain conjugated dienes and sulfur dioxide to form a heteropolymeric reaction product. In another aspect this invention relates to a method for the production of polymers wherein a polymer while present as product in a latex formed by emulsion polymerization of certain conjugated dienes is reacted with sulfur dioxide, and, to resins so produced.

This application is a continuation-in-part of my copending application Serial No. 127,995 filed November 17, 1949, now U. S. Patent 2,625,525, issued January 13, 1953, in which I have disclosed terpolymers of sulfur dioxide, monoolefinic materials and a liquid polymer of a conjugated diene, and their production. As set forth in the said copending application sulfur dioxide is interreacted with one or more unsaturated monomeric compounds and a liquid polymer of a diolefin hydrocarbon to produce the terpolymer product. Also disclosed in the said copending application is the polymerization of 1,3-butadiene in aqueous emulsion and the addition of sulfur dioxide to a resulting latex under conditions causing reaction between the sulfur dioxide and butadiene polymer product in the latex to form resinous heteropolymeric reaction product, exhibiting stability to heat and resistance to solvent action each markedly improved over those properties characteristic of known olefin-sulfur dioxide resins.

In accordance with this invention, a polymer while present as product in a latex formed by emulsion polymerization of a monomeric material comprising a conjugated diolefin hydrocarbon and/or one or more of certain substituted dienes is reacted with sulfur dioxide to form a heteropolymeric reaction product.

Conjugated diene materials utilized in the formation of a latex, as described above, include unsubstituted or certain substituted conjugated diolefin hydrocarbons containing from 4 to 10, preferably 4 to 6 carbon atoms in the molecule, alone or together with one or more other such diolefins, and also such diolefin or diolefins together with one or more compounds containing the group $CH_2=C<$ and copolymerizable therewith. Conjugated dienes to be polymerized include a diene which is an unsubstituted conjugated diolefin and also those conjugated diolefins which contain one or more of phenyl, alkyl, cyano, cyanate, isocyanate, thiocyanate, isothiocyanate and alkoxy radicals and the like as substituent groups. Illustrative of conjugated diene reactants employed in the formation of latices employed in accordance with this invention are 1,3-butadiene, 2,3-dimethyl-1,3-butadiene, isoprene, piperylene, 3-furyl-1,3-butadiene, 3-methoxy-1,3-butadiene, 1,4-dicyano-1,3-butadiene, 1,4-diisothiocyano-1,3-butadiene, 1-acetoxy-1,3-butadiene, 1,3-dioxycyano-2,4-hexadiene, 2,3-diphenyl-1,3-butadiene, 1,4-diisooxycyano - 1,3 - butadiene, 1-thiocyano-2,4-pentadiene, and the like. Exemplary of the compounds containing the $CH_2=C<$ group as described above and copolymerizable with conjugated diolefin hydrocarbons to form latices employed in the practice of this invention are aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride vinylidene chloride, vinyl furane, vinylcarbazole, vinylacetylene, vinyl pyridine and various substituted vinyl pyridines such as 2-methyl-5-vinyl pyridine and other unsaturated hydrocarbons, esters, alcohols, acids, ethers, etc., of the types described.

When copolymerizing a conjugated diene with a vinylidene compound, e. g., styrene, to form a latex, as described above, relative proportions of the monomers copolymerized can be selected as desired, although such proportions are preferably selected so that the reacted diene is at least 4 weight percent of the copolymer formed. Generally the weight ratio of diene to vinyl compound copolymerizable therewith, introduced into the aqueous emulsion polymerization system is within the range of .05:1 to 100:1.

The polymers present in the latex, formed as above described, range from liquid polymers having a viscosity of 100 Saybolt Furol seconds at 100° F. to rubbery polymers having a Mooney value (ML–4) generally not to exceed 100 to tough and flexible plastics to hard, horny types of plastics. Liquid polymers produced in this manner are non-rubber-like and are characterized by a molecular weight of 500–4000 (determined by freezing point lowering of benzene) and a viscosity not exceeding about 10,000 Saybolt Furol seconds at 100° F.

The latices utilized in the practice of this invention can be prepared in accordance with any suitable known emulsion polymerization recipe.

Emulsifying agents which are particularly applicable in the production of latices of polymers to be reacted with sulfur dioxide in the practice of my invention are those which are effective as emulsifiers in an acid medium, such as nonionic emulsifying agents, alkyl amine hydrochlorides, salts of alkyl aromatic sulfonic acids, salts of long chain alkyl sulfuric acids, and the like. Such materials as fatty acid and rosin acid soaps are often used, but when used an emulsifier effective in acid medium must be added to the latex before addition of sulfur dioxide thereto. The amount of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous latex forming phase may be varied over a rather wide range without producing deleterious effects on the conversion rate or the properties of the polymer produced. In general in basic-side polymerizations the pH can be within the range of 8.5 to 12, with the narrower range of 9.5 to 10.5 being most generally preferred, except when a polyamino compound is used as a reductant, in which case a somewhat higher pH is generally preferred. Also, in many cases acid-side polymerizations are employed.

Preferred polymerization modifiers employed in the formation of these latices are alkyl mercaptans, and these may be of primary, secondary, or tertiary configuration, and generally range from $C_8$ to $C_{16}$ compounds, but may have more or fewer carbon atoms per molecule. Mixtures or blends of marcaptans are also frequently considered desirable and in many cases are preferred to the pure compounds. The amount of marcaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used when producing latices containing rubbery polymer. Thus, the amount of marcaptan is adjusted to suit the case at hand. In some cases when producing rubbery polymers and plastic polymers, no modifier is necessary.

When it is desired that the polymer product in the latex consist entirely of liquid polymer, a proportion of mercaptan modifier is employed which is larger than that employed when forming rubbery polymer by aqueous emulsion, such as 3 to 20 parts by weight of an alkyl mercaptan per 100 parts by weight of total monomers introduced into the polymerization system. Alkyl mercaptans particularly applicable in aqueous emulsion production of liquid conjugated diene polymers are tertiary mercaptans containing at least 12 carbon atoms in the molecule, e. g., tertiary $C_{12}$, $C_{14}$ and $C_{16}$ mercaptans, or blends thereof.

Liquid polymers formed in the presence of such excessive amounts of mercaptan contain thioether linkages and can accordingly be looked upon as polymeric diolefin-mercaptan reaction products.

It is frequently desirable to include water-soluble components in the aqueous latex-forming phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase.

The total pressure on the latex forming reactants is preferably at least as great as the total vapor pressure of the mixture, so that the initial reactants will be present in liquid phase. Polymerization temperatures employed in the formation of these latices may range from —40 to 70° C.

The following recipes are given as examples of some of the types of polymerization recipes that can be used in accordance with known processes for formation of latices that can be utilized in the practice of my invention.

Suitable hydroperoxides for use in iron pyrophosphate (redox) and polyalkylene polyamine recipes and other recipes calling for an oxygen-yielding material are preferably organic hydroperoxides having the formula RR'R"COOH wherein each of R, R', and R" is an organic radical, or R'R" together comprise a tetramethylene or pentamethylene group forming with the

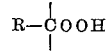

a cyclopentyl or cyclohexyl hydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substitutents include oxygen in the form of hydroxy and ether compounds, sulfur in similar compounds (i. e., mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyldecyl(methylphenyl)hydroperoxymethane, dimethyldecylhydroperoxymethane, methylchlorophenylphenylhydroperoxymethane, and tertiarybutylisopropylbenzene hydroperoxide (dimethyl(tertiary-butylphenyl)hydroperoxymethane).

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e. when the monomeric material is measured in pounds, the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide.

In the case of a diazothioether recipe, preferably diazothioethers have the formula R—N=N—S—R' where R and R' are aromatic groups containing substituents such as alkyl, chloro, nitro, methoxy, sulfonic acid group, and R' can also be cycoalkyl, substituted cycloalkyl, aliphatic, substituted aliphatic, and the like. These compounds act both as initiators and as modifiers in a polymerization recipe and hence may be used as both catalysts and modifiers in the recipe. However, it is preferred to use a modifier of the type noted above along with the

RECIPES

| Persulfate | Diazothioether | Iron Pyrophosphate (Redox) | Polyalkylene Polyamine |
|---|---|---|---|
| Conjugated monomeric diene.[1] Water. $K_2S_2O_8$. Modifier. Emulsifier. | Conjugated monomeric diene.[1] Water. Modifier (optional). Emulsifier. Diazothioether. | Conjugated monomeric diene.[1] Water. Modifier. Hydroperoxide. Emulsifier. Sugar (optional). Alkali-Metal Pyrophosphate. $FeSO_4.7H_2O$. | Conjugated monomeric diene.[1] Water. Electrolyte (optional). Alkali-Metal Hydroxide (optional). Emulsifier. Modifier. Hydroperoxide. Polyalkylene Polyamine. |

[1] A conjugated diene reactant of this invention alone or together with an unsaturated organic material copolymerizable therewith.

diazothioether in the practice of my invention. In certain instances, it may also be desirable to use a catalyst such as potassium or sodium ferricyanide in conjunction with the diazothioether. Examples of suitable diazothioethers include 2-(2,4-dimethyl-benzenediazomercapto)-naphthalene, 2-(4-methoxybenzenediazomercapto)-naphthalene (known in the art as MDN), 2-(2-methylbenzenediazomercapto)naphthalene, 2-(2,5 - dimethoxybenzenediazomercapto)naphthalene, 4 - (2,5 - dimethoxybenzenediazomercapto)toluene, 4-(2-naphthalenediazomercapto)-anisole, 2-(4-acetylaminobenzenediazomercapto)naphthalene, 2-(benzenediazomercapto)naphthalene, 2-(4-sulfobenzenediazomercapto)benzothiazole, 2-(1-naphthalenediazomercapto)naphthalene, 2-(4-chlorobenzenediazomercapto)naphthalene, 2-(5 - quinolinediazomercapto)naphthalene, 2 - (4 - nitrobenzenediazomercapto)naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.5 to about 5.0 parts by weight per 100 parts by weight of butadiene, can be used. The diazothioether can be added in increments throughout the polymerization reaction in order to provide more uniform modification and to obtain more efficient utilization of the diazothioether. If the diazothioether is the only modifying agent present, somewhat larger quantities are needed than is the case if other modifiers are used in conjunction therewith.

In the case of a polyalkylene polyamine recipe, the activating agent, i. e., a polyalkylene polyamine is preferably a polyethylene polyamine or a trimethylene polyamine. Suitable polyethylene polyamines have the general formula RNH(CHXCHXNH)$_m$(CHXCHX)$_n$NHR, where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of polyethylene polyamines which are applicable include ethylenediamine, hydrazine, diethylenetriamine, tetraethylenepentamine, di(methylethylene)triamine, N-(2-hydroxyethyl)-1,2-ethanediamine, N-phenylethylenediamine, N-cyclohexyl-N'-(2-aminoethyl)-1,2 - ethanediamine, N-(2-hydroxy-tert-butyl)-1,2 - propanediamine, carbamates of the foregoing, and the like.

Suitable trimethylene polyamines are preferably those having the general formula

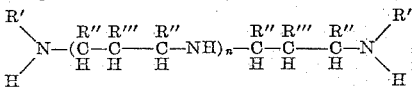

where each R' is one of the group consisting of hydrogen, methyl, ethyl, hydroxymethyl, hydroxyethyl, and carboxy radicals, each R" is hydrogen or methyl, and each R''' is hydrogen, methyl, or an activating substituent of the group consisting of —OR, —SR, —NR$_2$, —CN, —SCN, —COOR, —CHO, with R being hydrogen, methyl, ethyl, n-propyl, or isopropyl, or —CHR''' can be >C=O, and $n$ is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example, tri(trimethylene)tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in my process to some extent though it will be of course appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example, the following are mentioned: 1,3-diaminopropane, 1,3-diaminoacetone, 1,3-diamino-2-propanol, N,N'-dimethyl-1,3-diaminoacetone, N-ethoxy-1,3-diamino-2 - propanol, 1,3-diamino-2-carboxypropane, 1,3-diamino - 2-(dimethylamino)-propane, 2,4-diaminopentane, 1,3-diamino - 2 - cyanopropane, 1,3 - diamino-2-mercaptopropane, di(trimethylene)triamine, tri-(trimethylene)tetramine, tetra-(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the butadiene, except as such compounds may fortuitously be present as traces in the polymerization mixture. Similarly, no other reducing ingredient, such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of butadiene will give satisfactory results; however, greater or smaller amounts of polyamine can be used.

The above recipes can be varied widely in the particular combination of ingredients and in their relative proportions, the amount of water generally being from 50 to 250 parts by weight per 100 parts by weight of total monomer charged, although larger or smaller amounts may be employed.

Prior to utilization of the latex in the aqueous polymerization system, for reaction with sulfur dioxide, volatile unreacted monomeric reactants are vented from the said system, i. e., are withdrawn as vapors, after which the sulfur dioxide and catalyst, if the latter is employed, are admixed with the residual latex for effecting formation of the heteropolymeric product.

In carrying out a preferred embodiment of my invention, from 5 to 3000 parts of sulfur dioxide together with from 0.03 to 5.0 parts of a catalyst described hereinafter are admixed with a latex of the kind above described, all parts being parts by weight per 100 parts by weight of polymer product in the said latex. The resulting latex-sulfur dioxide-catalyst admixture is maintained under pressure sufficiently high for maintaining all reactants in liquid phase and under agitation at a temperature of from 50–120° F. Under these conditions sulfur dioxide and polymer react to form heteropolymeric products of my invention. I polymerize sulfur dioxide with the polymer to an extent such that from 2 to 100 percent of the olefinic double bonds present initially in said polymer react, depending upon the type product desired. Reaction times will therefore depend upon this factor, and the reaction conditions employed such as temperature, polymerization recipe used, nature of the polymer reactants, etc. However, reaction times employed are generally less than 25 hours and may be as short as 5 to 10 seconds, particularly when employing a continuous polymerization system. At the end of the reaction period, the agitation is stopped and excess sulfur dioxide is vented from the reaction system. The heteropolymeric product in the latex is then coagulated by any desired means such as by addition thereto of a coagulating agent such as methanol, brines or certain polyvalent metal salts as disclosed in copending Crouch application Serial No. 90,275, filed April 28, 1949, now U. S. Patent 2,686,171, issued August 10, 1954. The coagulum is then washed several times with water, and then if desired with an organic solvent such as n-heptane, and dried. However, instead of coagulating the latex it may be left in latex form, with or without addition of anti-oxidants and/or other stabilizing agents.

The amount of reacted sulfur dioxide is at least 0.3 weight percent of the heteropolymeric reaction product and is not more than that required completely saturating the olefinic double bonds of the polymer reacted therewith.

When vinyl pyridine polymer or a substituted vinyl pyridine polymer latex is reacted with sulfur dioxide according to my invention, the resulting heteropolymeric reaction product can be further modified by reaction of same with various known quaternizing agents, such as alkyl halides, arylalkyl halides, acyl halides, akyl sulfates and sulfonates, aryl sulfates and sulfonates, dialkyl sulfates, and the like; such as methyl p-toluenesulfonate, butyl benzene sulfonate, methyl sulfate, diethyl sulfate, methyl iodide, ethyl bromide, hexachloropentadiene, benzyl chloride, benzal chloride, halogenated wax, dilauryl sulfate, and the like. These products of quaternization exhibit a special utility as fungicides, insecticides, and bactericides, and as constituents in paints and various other surface coatings; also, as oil resistant rubbers and plastics in many applications.

When one or more of the monomers employed in producing the latex to be admixed with sulfur dioxide is relatively non-volatile, e. g., styrene, sulfur dioxide added to the vented latex may react with remaining residual or relatively non-volatile unreacted monomer, and in that case the desired product is admixed with monomer-sulfur dioxide reaction product. Therefore, it is usually preferred that the conjugated diene polymerization be carried out to effect substantially 100 percent conversion of any low volatility monomers so that the desired product will be free from monomer-sulfur dioxide reaction products.

The reaction of this invention between sulfur dioxide and polymer present as product in the said latex, appears to take place only in the liquid phase, and it will proceed in the presence of any one of a large number of catalysts such as those named hereinbelow, in the dark or in the light.

Catalysts applicable in carrying out the polymer-sulfur dioxide reaction of my invention are the same as those which have been found effective when carrying out the reaction between monoolefin hydrocarbons and sulfur dioxide to produce synthetic resins by methods heretofore employed. Examples of these catalytic materials include nitrates of alkali metals and ammonium, ferric polyphosphates such as ferric pyrophosphate, ferric tetraphosphate, ferric tripolyphosphate, and ferric hexametaphosphate, potassium persulfate, hydrogen peroxide, organic peroxides, peracetic acid, and the like. The amount of catalyst used may vary over a wide range and will depend upon the material chosen. In cases where alkali metal nitrates or ammonium nitrate are employed, the amount may vary from 0.03 to 0.60 part by weight per 100 parts by weight of total reactants, with an amount ranging from 0.15 to 0.45 part being generally preferred. When using other catalysts, the amount of catalyst used may be somewhat higher but in any event it is determined by the case at hand.

Temperatures for carrying out the sulfur dioxide-polymer reaction of this invention will usually fall within the range of about 10 to about 140° F. with the narrower range 50 to 120° F. being most frequently preferred. However, in some instances it may be considered advisable to employ temperatures below 10° F. in order to get a more satisfactory reaction.

The polymer-sulfur dioxide reaction products of my invention have many varied uses, depending upon the properties of the products produced. Examples are as constituents of paints and other surface coatings, particularly latex paints (in which instance the latices produced by my process are particularly useful); as non-extractable softeners for synthetic rubbers, as fillers for plastics, as rocket fuel constituents, as molding resins and rubbers, and to produce fibers and filaments for textiles.

My invention is illustrated by way of the following examples.

*Example I*

Liquid polybutadiene latex was made by emulsion polymerization according to the following recipe:

|  | Parts by weight |
|---|---|
| 1,3-butadiene | 100 |
| Water | 180 |
| Sodium alkyl benzene sulfonate | 5.0 |
| Potassium chloride | 0.5 |
| Cumene hydroperoxide | 0.10 |
| Potassium pyrophosphate | 0.177 |
| Ferrous sulfate heptahydrate | 0.14 |
| Potassium hydroxide | 0.10 |
| Dextrose | 1.0 |
| Tert-dodecyl mercaptan | 6.0 |
| Tert-tetradecyl mercaptan | 2.0 |
| Tert-hexadecyl mercaptan | 2.0 |

The reaction mixture was agitated for 16 hours at 5° C. at the end of this time the agitation was stopped and the excess butadiene was vented from the latex. Analysis showed that the latex contained 11.6 weight percent polymer. A sample of the latex was coagulated, and the recovered polymer was a clear, freeflowing liquid having a Saybolt Furol viscosity of about 1200 seconds at 100° F. and a molecular weight below about 3000.

To 50 parts of the polybutadiene latex prepared as described above were added 20 parts of sulfur dioxide and 1.5 parts of a 10 weight percent aqueous solution of lithium nitrate catalyst. This reaction mixture was agitated for 42 hours at 25° C. At the end of this period the agitation was stopped and the excess sulfur dioxide was vented from the latex. The latex was coagulated with methanol and filtered. The polymer was washed several times with methanol and with water, then dried in vacuo. It was a hard, white solid which on analysis was found to contain 21.54 weight percent sulfur. This product was insoluble in hydrocarbons, water, acetone, and cyclohexanone. Isoamyl acetate or sulfolane had no solvent effect on it.

By way of comparison, a sample of 1-butene-sulfur dioxide resin was found to be soluble in acetone and cyclohexanone. The butadiene-sulfur dioxide resin was found to be substantially completely stable to heat at 400° F., whereas the 1-butene-sulfur dioxide resin lost more than 10 percent of its weight by decomposition after being heated at 400° F. for fifteen minutes.

*Example II*

A polybutadiene latex was prepared at 41° F. in accordance with the following recipe:

|  | Parts by weight |
|---|---|
| Butadiene | 100 |
| Water | 180 |
| Santomerse No. 3 [1] | 1.25 |
| Tert-butylisopropylbenzene hydroperoxide | 0.114 |
| $K_4P_2O_7$ | 0.177 |
| $FeSO_4.7H_2O$ | 0.14 |
| KOH | 0.04 |
| Mercaptan blend [2] | 0.36 |

[1] Alkyl aryl sodium sulfonate.
[2] A blend of $C_{12}$, $C_{14}$, and $C_{16}$ aliphatic mercaptans in a ratio of 3:1:1 parts by weight.

Polymerization reached 33.7 percent conversion in 19 hours. The reaction was shortstopped with 0.15 part dinitrochlorobenzene and one part 2,2-methylene-bis-(4-methyl-6-tert-butylphenol) added as the antioxidant. The unreacted butadiene was vented. The product had a Mooney value (ML-4) of 22.

The polybutadiene latex, prepared as described above, was treated with sulfur dioxide in the presence of hydrogen peroxide as a catalyst. The catalyst (3 percent based on the polybutadiene) and an excess of sulfur dioxide were added to the latex, the reactor was closed, and the mixture allowed to stand 5 hours. The temperature was maintained at 77° F. The product was coagulated by pouring it into isopropyl alcohol. The amount of sulfur dioxide which had reacted, as determined by an analysis for sulfur, was 1.6 percent, based on polybutadiene.

The coagulated polybutadiene-sulfur dioxide reaction product subsequent to washing and drying was compounded in accordance with the following recipe:

|  | Parts by weight |
|---|---|
| Polybutadiene-$SO_2$ reaction product | 100.0 |
| Titanium dioxide | 50.0 |
| Zinc oxide | 5.0 |
| Circo light oil [1] | 10.0 |
| Agerite Alba [2] | 1.0 |
| Stearic acid | 2.0 |
| Santocure [3] | 1.0 |
| A-32 [4] | 0.2 |

[1] Odorless, light-gold-colored oil; sp. gr. 0.92; Saybolt viscosity at 100° F., about 155 seconds.
[2] Hydroquinone monobenzyl ether.
[3] N-cyclohexyl-2-benzothiazolesulfenamide.
[4] Reaction product of butyraldehyde and butylidene aniline.

The stock was cured 45 minutes at 307° F. and physical properties determined. The following results were obtained:

|  |  |
|---|---|
| Tensile, p. s. i., 80° F | 400 |
| Elongation, percent, 80° F | 375 |
| Tensile, p. s. i., 200° F | 220 |
| Tear resistance, 80° F | 70 |
| Tear resistance, 158° F | 60 |
| Compression set, percent, 2 hours at 212° F | 11.2 |
| Shore hardness, 80° F | 45 |
| Shore hardness, 30 min. at −35° F | 57 |
| Percent swelled (vol.) [1] | 226 |
| Percent extracted [1] | 9.3 |

[1] The swelling test was made on the cured sample by immersing it in a mixture containing 30 percent toluene and 70 percent isooctane at 158° F. for 48 hours and then drying it for three days at 158° F. The percent material extracted was determined by the weight method. A sample was weighed prior to the swelling test, immersed in the extraction liquid for the requisite period, dried, and weighed again.

*Example III*

A polybutadiene latex was prepared at 41° F. in accordance with the following recipe:

|  | Parts by weight |
|---|---|
| Polybutadiene | 100 |
| Water | 180 |
| Santomerse No. 3 [1] | 1.25 |
| Diisopropylbenzene hydroperoxide | 0.107 |
| Mercaptan blend [2] | 0.48 |
| KOH | 0.04 |
| $K_4P_2O_7$ | 0.177 |
| $FeSO_4.7H_2O$ | 0.14 |

[1] Alkyl aryl sodium sulfonate.
[2] A blend of $C_{12}$, $C_{14}$, and $C_{16}$ aliphatic mercaptans in a ratio of 3:1:1 parts by weight.

Polymerization reached 73 percent conversion in 16 hours. The unreacted butadiene was vented and then one percent lithium nitrate, based on the polybutadiene, was added. The latex was stabilized by adding 5 percent cetylpyridinium chloride, an excess of sulfur dioxide was then introduced, and the mixture was allowed to stand. The temperature was maintained at 77° F. for a 24-hour period. The amount of sulfur dioxide which had reacted, as determined by an analysis for sulfur, was 15 percent, based on polybutadiene.

The coagulated polybutadiene-sulfur dioxide reaction product subsequent to washing and drying was compounded in accordance with the following recipe:

|  | Parts by weight |
|---|---|
| Polybutadiene-$SO_2$ reaction product | 100 |
| Litharge | 40.0 |
| Staybelite resin [1] | 2.5 |
| Captax [2] | 3.0 |

[1] Hydrogenated rosin: brittle solid with pale amber color and slight odor; sp. gr. 1.045; M. P., 76° C.; acid no., 162; saponification no., 167.
[2] 2-mercaptobenzothiazole.

The stock was cured 45 minutes at 307° F. and physical properties determined. The following results were obtained:

|  |  |
|---|---|
| Tensile, p. s. i., 80° F | 340 |
| Elongation, percent, 80° F | 290 |
| Tensile, p. s. i., 200° F | 130 |
| Tear resistance, 80° F | 75 |

The above examples illustrate the formation of latices and reaction of sulphur dioxide with polymer product therein to form novel heteropolymeric resins, which are vulcanizable and particularly characterized by their high resistance to heat and to solvent action.

Variation and modification are possible within the scope of the foregoing disclosure and the appended claims to this invention, the essence of which is that heteropolymeric resins and vulcanizates made from these resins are provided, which resins are prepared by reacting a polymer while present as product in a latex formed by aqueous emulsion polymerization of certain conjugated dienes, with sulfur dioxide; and that liquid conjugated diolefin polymers are provided, prepared in aqueous emulsion in the presence of high concentrations of alkyl mercaptan.

As used in the specification and appended claims, the term vinylidene is meant to refer to the $CH_2=C<$ group in its broadest sense, and includes the vinyl group, $CH_2=C<H$.

I claim:

1. A process comprising admixing a polymer, while present as a product in a latex formed by polymerization of a diene selected from the group consisting of an unsubstituted conjugated diolefin and a conjugated diolefin containing at least one substituent radical selected from the group consisting of phenyl, alkyl, cyano, cyanate, isocyanate, thiocyanate, isothiocyanate and alkoxy, in aqueous emulsion in the presence of a polymerization catalyst, a mercaptan modifier, and a soap emulsifier to form a resulting latex, with sulfur dioxide and a catalyst capable of inducing reaction of sulfur dioxide with a monoolefin hydrocarbon in the absence of light and then catalytically reacting sulfur dioxide with polymer in said latex, and recovering a heteropolymeric resin product.

2. A process comprising reacting a polymer while present as a product in a latex formed by aqueous emulsion polymerization of a conjugated diolefin hydrocarbon, with sulfur dioxide, and recovering a resin as a product of the process.

3. A process for the preparation of a heteropolymeric resin comprising admixing a polymer, while present as a product in a latex formed by aqueous emulsion polymerization of a monomeric material comprising a conjugated diolefin hydrocarbon, with sulfur dioxide and a catalyst capable of inducing reaction of sulfur dioxide and a monoolefin hydrocarbon in the absence of light, reacting sulfur dioxide in the resulting admixture with polymer present therein as a component of said latex, and recovering a heteropolymeric reaction product as a product of the process.

4. A process comprising admixing a polymer, while present as a product in a latex formed by aqueous emulsion polymerization of a monomeric material comprising a conjugated diolefin hydrocarbon containing from 4 to 10 carbon atoms per molecule and venting any unreacted monomer vapors from the polymerization zone, admixing with resulting latex from 5 to 3000 parts of sulfur dioxide and from 0.03 to 5.0 parts by weight of a catalyst capable of inducing reaction of sulfur dioxide with a monoolefin hydrocarbon in the absence of light, all said parts being parts by weight per 100 parts by weight of polymer present in latex admixed with sulfur dioxide as above described, maintaining the resulting admixture at a temperature within the range of 10–140° F., whereby polymer and sulfur dioxide therein react to form a polymerization product, and recovering product thus formed.

5. A process of claim 4 wherein said temperature is maintained for a period sufficient for reacting at least 50 percent of the polymer present in said admixture.

6. A process comprising admixing a polymer while present as a product in a latex formed by aqueous emulsion polymerization of a monomeric material comprising a conjugated diolefin hydrocarbon containing from 4 to 10 carbon atoms per molecule, with from 5 to 3000 parts by weight of sulfur dioxide and from 0.03 to 5.0 parts by weight of a catalyst capable of inducing reaction of sulfur dioxide with a monoolefin hydrocarbon in the absence of light, all parts being parts by weight per 100 parts by weight of polymer in the resulting admixture, maintaining said resulting admixture at a temperature in the range of from 10 to 140° F. for a period of from 5 seconds to 25 hours, and recovering a heteropolymeric reaction product as a product of the process.

7. A process of claim 6 wherein said reactant material comprises a conjugated diolefin hydrocarbon and a vinylidene compound copolymerizable therewith and wherein the amount of said diolefin hydrocarbon reacted to form copolymer with said vinyl compound is at least 5 weight percent of the copolymer so produced.

8. A process of claim 7 wherein said vinylidene compound is substantially completely reacted to form said copolymer.

9. A process of claim 7 wherein said conjugated diolefin is 1,3-butadiene and said vinylidene compound is styrene.

10. A process of claim 7 wherein said vinylidene compound is selected from the group consisting of a vinyl pyridine and a substituted vinyl pyridine.

11. A process of claim 10 wherein said heteropolymeric reaction product is reacted with a quaternizing compound.

12. A process of claim 11 wherein said quaternizing compound is methyl iodide.

13. A process of claim 6 wherein the amount of reacted sulfur dioxide is at least 0.3 weight percent of said heteropolymeric reaction product and is not more than that required for completely saturating the olefinic double bonds of polymer reacted therewith.

14. A process of claim 6 wherein said catalyst is hydrogen peroxide.

15. A process of claim 6 wherein said catalyst is lithium nitrate.

16. A process of claim 6 wherein said polymer is a liquid characterized by a molecular weight of from 500 to 4000 and has a viscosity below 10,000 Saybolt Furol seconds as measured at 100° F.

17. A process of claim 6 wherein said conjugated diolefin hydrocarbon contains from 4 to 6 carbon atoms in the molecule.

18. A process of claim 6 wherein said heteropolymeric reaction product is recovered by first venting unreacted sulfur dioxide from the zone of sulfur dioxide-polymer reaction and then admixing a coagulant with the residual aqueous mixture to coagulate heteropolymeric reaction product therein, and recovering coagulum thus formed as said product of the process.

19. A heteropolymeric reaction product formed by the reaction of sulfur dioxide with a polymer while present as product in a latex produced by aqueous emulsion polymerization of a conjugated diolefin hydrocarbon, and formed from at least 0.3 percent of its weight of sulfur dioxide and from not more sulfur dioxide than required for saturating all olefinic double bonds in said polymer.

20. A product of claim 19 wherein said polymer is formed by polymerization solely of 1,3-butadiene.

21. A product of claim 19 produced when said polymer is formed by copolymerization of a conjugated diolefin hydrocarbon with a monomer selected from the group consisting of a vinyl pyridine and a substituted vinyl pyridine, and when the heteropolymeric product so produced is then reacted with a quaternizing agent.

22. A product of claim 19 when said polymer is formed by copolymerization of 1,3-butadiene and a vinylidene compound copolymerizable therewith.

23. A product of claim 19 produced when said polymer is formed by copolymerization of a conjugated diolefin hydrocarbon with a vinylidene compound copolymerizable therewith, and copolymer then produced is formed from at least 5 percent of its weight of said diolefin hydrocarbon.

24. The product formed by polymerization of sulfur dioxide with the product formed by polymerization of a conjugated diolefin hydrocarbon while maintained in aqueous emulsion in the presence of from 3 to 20 parts by weight of alkyl mercaptan per 100 parts by weight of said conjugated diolefin hydrocarbon.

25. The product of claim 24 wherein said diolefin hydrocarbon is 1,3-butadiene.

26. A product of vulcanization of a heteropolymeric reaction product formed by the reaction of sulfur dioxide with a polymer while present as product in a latex produced by aqueous emulsion polymerization of a conjugated diolefin hydrocarbon, and formed from at least 0.3 percent of its weight of sulfur dioxide and from not more sulfur dioxide than required for saturating all olefinic double bonds in said polymer.

27. A latex of a heteropolymeric reaction product formed by the reaction of sulfur dioxide with a polymer while present as product in a latex produced by aqueous emulsion polymerization of a conjugated diolefin hydrocarbon, and formed from at least 0.3 percent of its weight of sulfur dioxide and from not more sulfur dioxide than required for saturating all olefinic double bonds in said polymer.

28. A process comprising reacting a polymer with sulfur dioxide while present as a product in a latex formed by aqueous emulsion polymerization of a diene selected from the group consisting of an unsubstituted conjugated diolefin and a conjugated diolefin containing at least one substituent radical selected from the group consisting of phenyl, alkyl, cyano, cyanate, isocyanate, thiocyanate, isothiocyanate and alkoxy.

29. A product of vulcanization of a heteropolymeric reaction product formed by the reaction of sulfur dioxide with a polymer while present as product in a latex produced by aqueous emulsion polymerization of a diene selected from the group consisting of an unsubstituted conjugated diolefin and a conjugated diolefin containing at least one substituent radical selected from the group consisting of phenyl, alkyl, cyano, cyanate, isocyanate, thiocyanate, isothiocyanate and alkoxy.

30. A latex of a heteropolymeric reaction product formed by the reaction of sulfur dioxide with a polymer while present as product in a latex produced by aqueous emulsion polymerization of a diene selected from the group consisting of an unsubstituted conjugated diolefin and a conjugated diolefin containing at least one substituent radical selected from the group consisting of phenyl, alkyl, cyano, cyanate, isocyanate, thiocyanate, isothiocyanate and alkoxy.

31. A heteropolymeric reaction product formed by the reaction of sulfur dioxide with a polymer while present as product in a latex produced by aqueous emulsion polymerization of a diene selected from the group consisting of an unsubstituted conjugated diolefin and a conjugated diolefin containing at least one substituent radical selected from the group consisting of phenyl, alkyl, cyano, cyanate, isocyanate, thiocyanate, isothiocyanate and alkoxy.

References Cited in the file of this patent

UNITED STATES PATENTS

| | | |
|---|---|---|
| 2,469,847 | Rumscheidt | May 10, 1949 |
| 2,555,068 | Van Veersen | May 29, 1951 |
| 2,625,525 | Lynch | Jan. 13, 1953 |